US012607817B2

(12) United States Patent
O'Connor

(10) Patent No.: US 12,607,817 B2
(45) Date of Patent: Apr. 21, 2026

(54) RECONFIGURABLE MODULAR FIBER OPTIC CASSETTE

(71) Applicant: Hubbell Incorporated, Shelton, CT (US)

(72) Inventor: Douglas Paul O'Connor, Mystic, CT (US)

( * ) Notice: Subject to any disclaimer, the term of this patent is extended or adjusted under 35 U.S.C. 154(b) by 505 days.

(21) Appl. No.: 18/125,092

(22) Filed: Mar. 22, 2023

(65) Prior Publication Data

US 2023/0305254 A1 Sep. 28, 2023

Related U.S. Application Data

(60) Provisional application No. 63/269,749, filed on Mar. 22, 2022.

(51) Int. Cl.
G02B 6/44 (2006.01)

(52) U.S. Cl.
CPC .................................. G02B 6/4454 (2013.01)

(58) Field of Classification Search
CPC .............................. G02B 6/4453; G02B 6/4454
See application file for complete search history.

(56) References Cited

U.S. PATENT DOCUMENTS 8,781,284 B2 * 7/2014 Bragg ................... H01R 13/627
361/627
11,585,996 B2 * 2/2023 Ruiz ..................... G02B 6/4455

2010/0142910 A1 * 6/2010 Hill ...................... G02B 6/4454
385/135
2012/0328258 A1 * 12/2012 Barron ................. G02B 6/4454
385/135
2020/0073060 A1 * 3/2020 Grandidge ........... G02B 6/4454

FOREIGN PATENT DOCUMENTS

EP 3109683 B1 2/2018

OTHER PUBLICATIONS

OptiCom® MPO-LC Fiber Cassette OS2, 24 Fiber, Universal, All Products [online]. Panduit. [retrieved on May 11, 2023]. Retrieved from the Internet: <URL:https://www.panduit.com/en/products/fiber-optic-systems/fiber-optic-panels-cassettes-enclosures/fiber-optic-cassettes/fc29n-24-10u.html>.

(Continued)

*Primary Examiner* — Uyen Chau N Le
*Assistant Examiner* — Hoang Q Tran
(74) *Attorney, Agent, or Firm* — Verrill Dana, LLP; Robert L. Hover

(57) ABSTRACT

Reconfigurable modular fiber optic cassettes are provided including a cassette assembly having first and second half-cassettes each having one or more sides extending from a surface, assembly tabs formed in/on the sides wherein, in a mirrored orientation of the first and second half-cassettes, the assembly tabs interlock to form the cassette assembly, an interior volume of the cassette assembly, at least one opening in the sides sized to receive an adapter panel, and mounting tabs extending from the sides, the mounting tabs configured to interlock with mounting slots of an adapter plate, an adapter panel including the adapter plate having the mounting slots and adapter slots between the mounting slots, and one or more adapters mounted in the adapter slots.

18 Claims, 10 Drawing Sheets

(56)              References Cited

OTHER PUBLICATIONS

QuickNet™ SFQ MPO-LC Cassette, OS2, 12 Fiber, Method A, All Products [online]. Panduit. [retrieved on May 11, 2023]. Retrieved from the Internet: <URL:https://www.panduit.com/en/products/fiber-optic-systems/fiber-optic-panels-cassettes-enclosures/fiber-optic-cassettes/fq9n-12-10as.html>.

QuickNet™ MTP* Fibert Optic Cassettes, Specification Sheet [online]. Panduit. [retrieved on May 11, 2023]. Retrieved from the Internet: <URL:https://www.panduit.com/content/dam/panduit/en/products/media/5/85/985/2985/106652985.pdf>.

Momentum 2 Cassette—Single-Mode Fiber—1U-12 Fibers—SC Duplex Connectors, Products [online]. Legrand. [retrieved on May 11, 2023]. Retrieved from the Internet: <URL:https://www.legrand.us/network-infrastructure/fiber-optic/fiber-cassettes/momentum-2-cassette-single-mode-fiber-1u-12-fibers-sc-duplex-connectors/p/m2scd12-09>.

CommScope standard density fiber optic panels. Product Brochure [online]. CommScope. [retrieved on May 11, 2023]. Retrieved from the Internet: <URL:https://www.commscope.com/globalassets/digizuite/3273-sd-fiber-panels-br-111463-en.pdf>.

FiberExpress Patch Panel Systems. Product Brochure [online]. CommScope. [retrieved on May 11, 2023]. Retrieved from the Internet: <URL:https://www.belden.com/hubfs/resources/technical/other/cassettes-frames-splice-cassettes-part-numbers.pdf>.

International Search Report and Written Opinion, issued in corresponding International Application No. PCT/US23/15983, mailed Jun. 28, 2023, 7 pages.

* cited by examiner

RECONFIGURABLE MODULAR FIBER OPTIC CASSETTE

CROSS-REFERENCE TO RELATED APPLICATION(S)

This application claims the benefit of priority to U.S. Provisional Application No. 63/269,749, filed Mar. 22, 2022, which is incorporated herein by reference.

FIELD OF THE INVENTION

This invention relates to fiber optic cassettes and more particularly to reconfigurable modular fiber optic cassettes.

BACKGROUND OF THE INVENTION

Fiber optic cables and optical fibers to be routed through a building (e.g., for networking in an office building) are generally routed to either wall or rack patch panels (also referred to as fiber distribution panels for cross-connection and/or termination. At the patch panel, the cables generally connect to and terminate at a connector or adapter mounted to an adapter panel. Behind the adapter panel, the cable can be separated into its constituent individual optical fibers for cross-connection within the patch panel before connecting to patch cables for downstream routing. In some instances, the individual fibers can be routed through a splice tray within the patch panel.

Conventionally, for wall patch panels, the adapter panel is configured as a substantially flat, usually metallic, adapter plate, attachable to the wall patch panel via one or more fasteners or other attachment means. For example, some adapter panels adhere to the dimensional and fastener requirements associated with the Light Guide Cross-Connect (hereinafter "LGX") standard, in which case such adapter panels typically use LGX compatible fasteners (e.g., LGX push pins). The adapter panel typically includes at least one mounting slot formed therein for receiving a particular type of adapter. The number and configuration of the mounting slots typically depends on the type of adapter required and other installation requirements. In some instances, the adapters can be pre-installed on the adapter plate either by the manufacturer or by the electrician before arrival at the jobsite.

On the other hand, referring now to FIG. 1 (PRIOR ART), for rack patch panels, adapter cassettes 100 are provided, which are configured to slide into or otherwise be installed on a rack of the rack patch panel (not shown). In such cassettes 100, the adapter plate 105 is conventionally formed into a side face of a lower portion 103 of the cassette 100. After installation of each individual adapter 107 into the adapter plate 105, as well as fiber separation and/or cross-connection within the cassette 100, a top portion 101 of the metallic cassette 100 must then be placed over the lower portion 103 and the cassette 100 screwed together using multiple conventional screws 109. This process is slow, time-consuming work, which drives both scheduling delays and high labor costs associated with the installation.

Furthermore, as with the conventional cassette 100 shown in FIG. 1, even where the overall width and height of the adapter plate 105 is standardized according to a standard such as LGX, the other dimensions and configuration (e.g., the size, number, and position of the adapter slots of the adapter plate 105 often installation-specific and thus the adapter plate 105 (and by extension, the lower portion 103 into which it is integrated) must be customized to those requirements. Such customization also typically dictates that each upper portion 101 of the cassette 100 must also be unique to that particular adapter plate 105/lower portion 103 configuration. The end result is increased costs because suppliers need to keep stock of a full line of bulky, application-specific cassette parts in addition to a full set of adapter plates used for wall patch panels. Worse, space is typically too limited on worksite vehicles for an inventory of every type of connector to be kept on the vehicle. Consequently, the installer may discover that they need to return to a warehouse or office to acquire a missing part, causing work stoppage and incurring further costs and delays.

SUMMARY OF INVENTION

Provided herein are reconfigurable modular fiber optic cassettes for connecting and cross-connecting optical fibers and cables.

In one aspect, a reconfigurable modular fiber optic cassette is provided. The reconfigurable modular fiber optic cassette includes a cassette assembly. The cassette assembly includes first and second half-cassettes each having one or more sides extending outward from a surface thereof and around a portion of a circumference thereof. The cassette assembly also includes a plurality of assembly tabs, each formed in or on the one or more sides wherein, in a mirrored orientation of the first and second half-cassettes, the plurality of assembly tabs interlocks to form the cassette assembly. The cassette assembly also includes an interior volume of the cassette assembly defined between the surfaces and the sides of the first and second half-cassettes. The cassette assembly also includes at least one opening defined in the sides of the cassette assembly, the opening sized to receive an adapter panel. The cassette assembly also includes first and second mounting tabs extending from the sides of the cassette assembly adjacent the opening, the first and second mounting tabs configured to interlock with first and second mounting slots of an adapter plate. The reconfigurable modular fiber optic cassette also includes the adapter panel. The adapter panel includes the adapter plate. The adapter plate includes the first and second mounting slots defined therein. The adapter plate also includes one or more adapter slots defined in the adapter plate between the first and second mounting slots. The adapter panel also includes one or more adapters mounted in the adapter slots.

In some embodiments the reconfigurable modular fiber optic cassette also includes at least one aperture formed in the sides of the cassette assembly. In some embodiments the aperture is sized to receive at least one of a multi-fiber push-on adapter, a multi-fiber termination push-on adapter, or a blanking plate. In some embodiments the cassette assembly further comprises a structural support extending between the surface of the first half-cassette and the surface of the second half-cassette. In some embodiments the adapter panel is a LGX adapter panel. In some embodiments the adapters include at least one of a subscriber connector simplex, a subscriber connector duplex, a Lucent Connector Duplex, a Lucent Connector Quad, a straight tip connector, a ferrule connector, a mechanical transfer registered jack, a multi-fiber push-on, a multi-fiber termination push-on, or combinations thereof. In some embodiments the adapter plate includes 12 adapter slots formed therein. In some embodiments the adapter plate includes 6 adapter slots formed therein. In some embodiments the 6 adapter slots are arranged linearly between the mounting slots. In some embodiments the 6 adapter slots are arranged in a 2×3 array between the mounting slots. In some embodiments the adapter plate includes 3 adapter slots formed therein. In some embodiments the adapters are mounted to the adapter slots by a push-on attachment mechanism.

In some embodiments the adapters are mounted to the adapter slots by a flange and screw attachment. In some embodiments each of the first and second half-cassettes is formed from at least one of stamped steel, cast iron, cast aluminum, PVC, plastics including molded plastics, extruded plastics, or cast plastics, fiberglass, or combinations thereof. In some embodiments the reconfigurable modular fiber optic cassette also includes a splice tray formed in each of the first and second half-cassettes. In some embodiments the aperture sized to receive a fiber trunk line. In some embodiments the reconfigurable modular fiber optic cassette also includes a fusion splice holder positioned within the interior volume of the cassette assembly. In some embodiments the reconfigurable modular fiber optic cassette also includes a splice tray positioned within the interior volume of the cassette assembly.

BRIEF DESCRIPTION OF THE FIGURES

Embodiments of the present disclosure will now be described, by way of example only, with reference to the attached Figures, wherein.

DETAILED DESCRIPTION OF THE INVENTION

Figure 1:
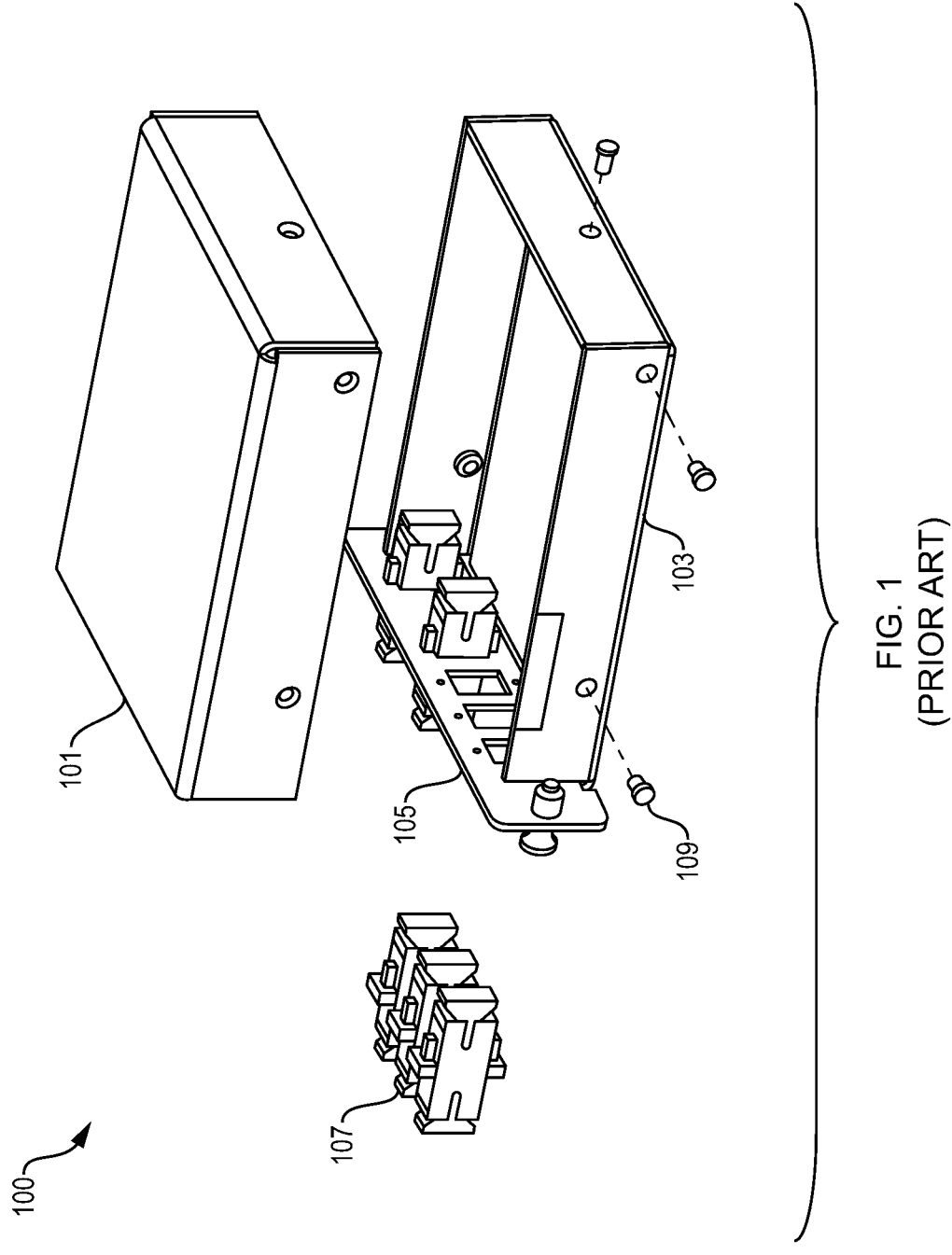
FIG. 1 is an exploded view of a fiber optic cassette in accordance with the prior art.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments, as the skilled artisan would recognize, even if not explicitly stated herein. Descriptions of well-known components and processing techniques may be omitted to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Provided herein are reconfigurable modular fiber optic cassettes for use in connection with installation of fiber optic cabling.

Figure 2A:
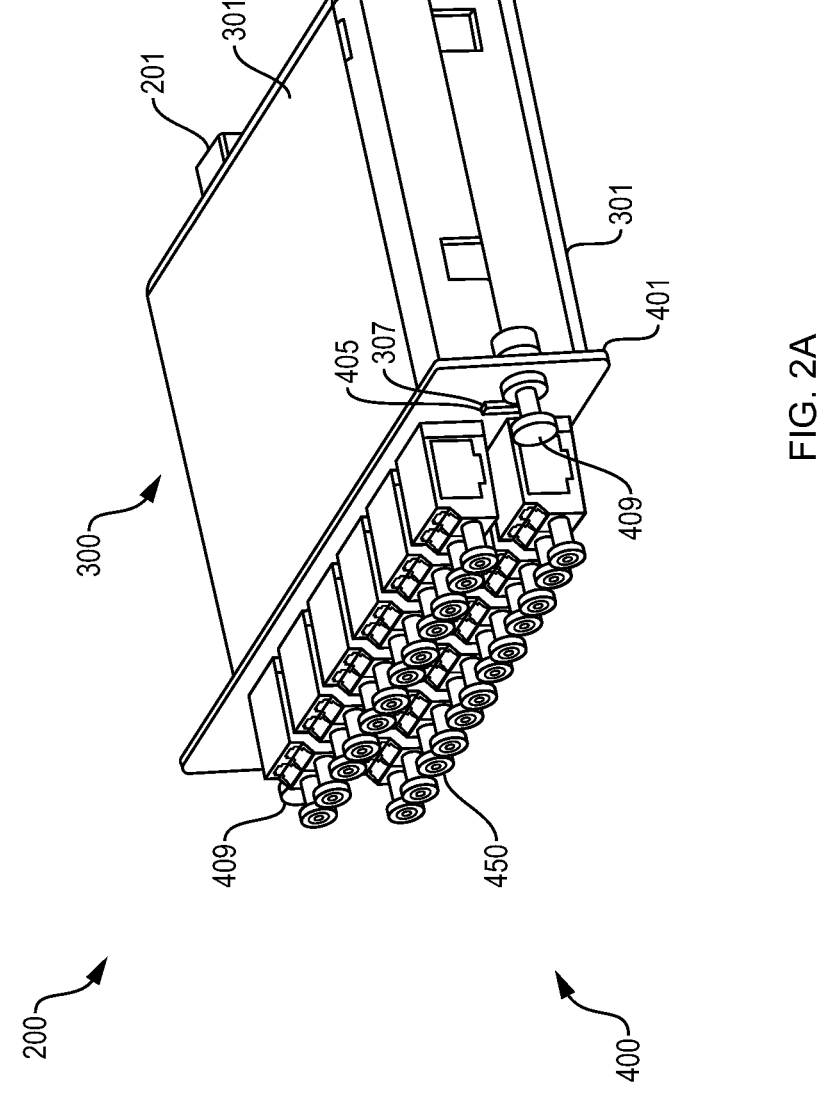
FIG. 2A is an isometric top view of a reconfigurable modular fiber optic cassette in accordance with various embodiments.

As shown in FIG. 2A, reconfigurable modular fiber optic cassettes 200 described herein can generally include a cassette 300 configured for replaceable attachment to an adapter panel 400.

Figure 3A:
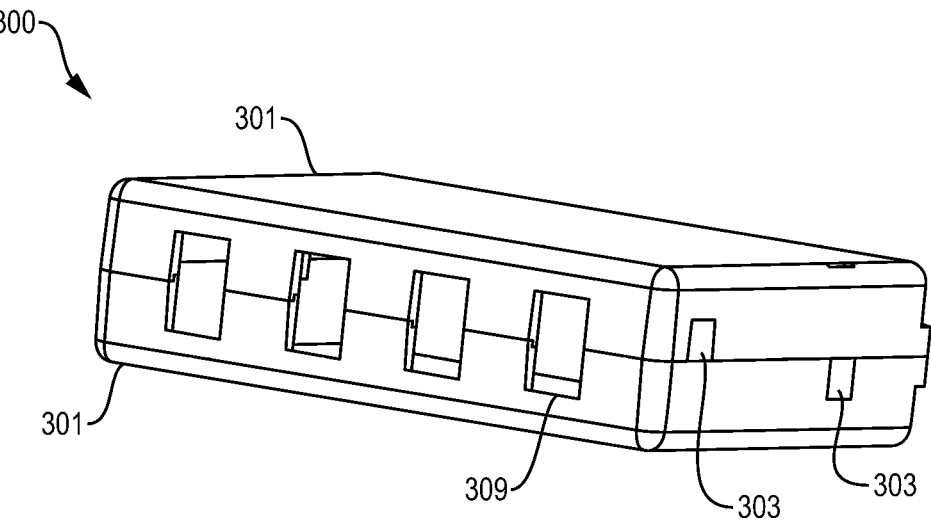
FIG. 3A is an isometric rear view of a cassette portion of the reconfigurable modular fiber optic cassette of FIG. 2A in accordance with various embodiments.
Figure 3B:
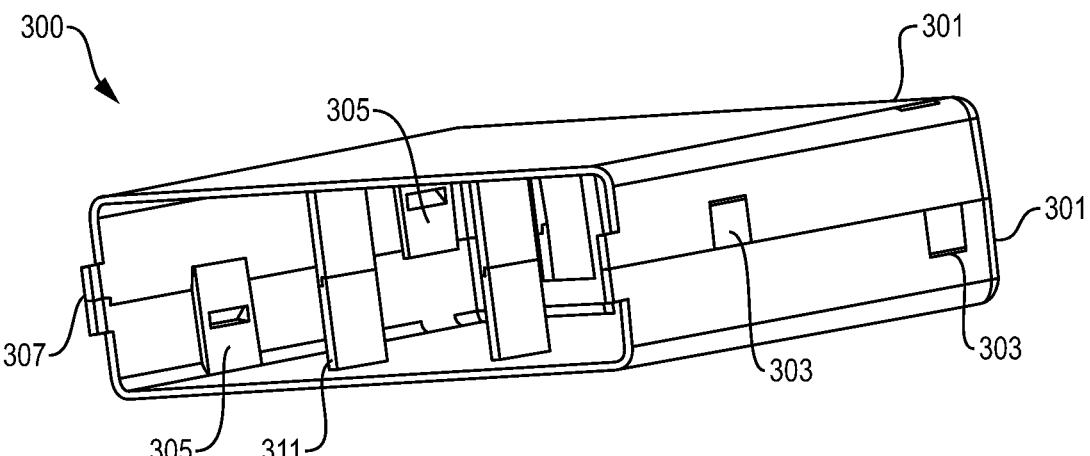
FIG. 3B is an isometric front view of a cassette portion of the reconfigurable modular fiber optic cassette of FIG. 2A in accordance with various embodiments.
Figure 3C:
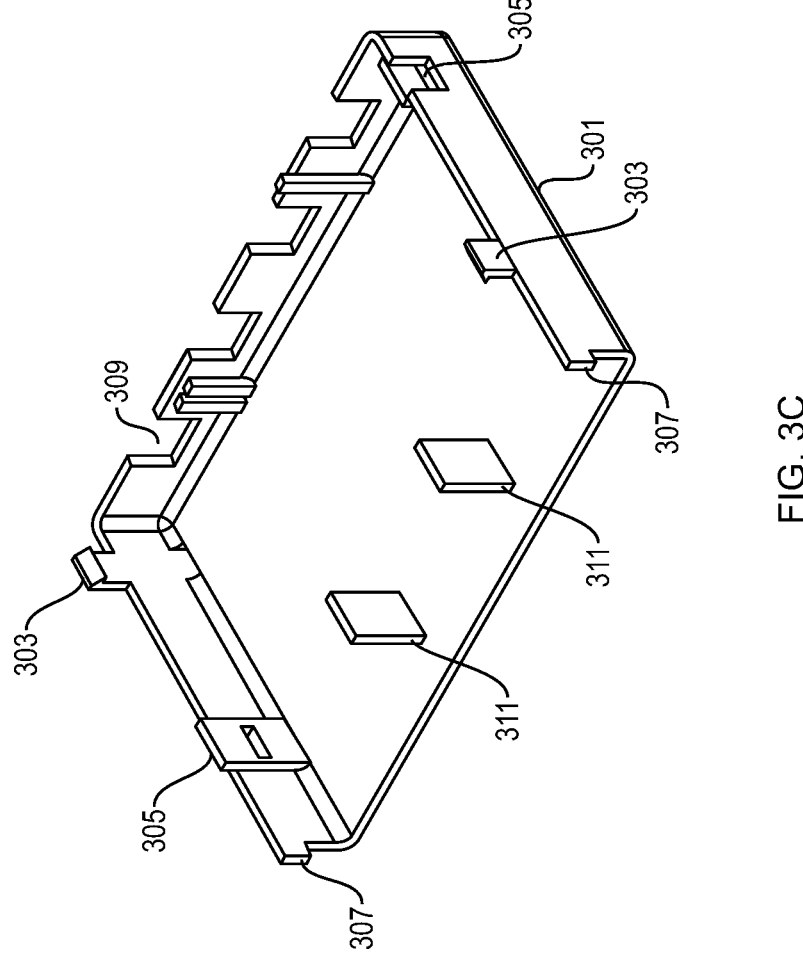
FIG. 3C is an isometric top view of a universal half-cassette of the reconfigurable modular fiber optic cassette of FIG. 2A in accordance with various embodiments.

Referring now to FIGS. 3A-3C, the cassette 300 can be assembled from two identical, interlocking half-cassettes 301. The half-cassettes 301 can each preferably be formed as a single piece and can be constructed out of any suitable material. For example, each half-cassette 301 can be constructed of any metal or non-metallic material including, for example, stamped steel, cast iron, cast aluminum, PVC, plastics, fiberglass, combinations thereof, or any other suitable material and can be made via any suitable manufacturing process such as, for example, molding, casting, machining, 3D printing, etc., or combinations thereof.

In order to facilitate assembly of two half-cassettes 301 to form the cassette 300, each half-cassette 301 can include a plurality of female assembly tabs 305 formed thereon, each configured to receive and interlock with one of a plurality of corresponding male assembly tabs 303 also formed thereon. As best shown in FIG. 3C, in some embodiments, the male and female tabs 303, 305 can be positioned in a mirrored, alternating arrangement on opposing sides of the half-cassette 301. Such arrangement advantageously permits the cassette 300 to be assembled from identical half-cassettes 301 because, when the half cassettes 301 are placed in a mirrored orientation for assembly (e.g., as shown in FIG. 2B), the male tabs 303 of the upper half-cassette 301 align with the corresponding female tabs 305 of the lower half-cassette 301 and the female tabs 305 of the upper half-cassette 301 align with the corresponding male tabs 303 of the lower half-cassette 301, thus providing interlocking retention of each half-cassette 301 in the assembled cassette 300.

In view of the two-identical half-cassette 301 assembly described above, it will be clear from this disclosure and the accompanying drawings (e.g., FIGS. 2A-2B and 3A-3C) that the other features of the cassette 300 described herein are generally assembled from half-features formed on each half-cassette 301, unless specified otherwise.

Figure 2B:
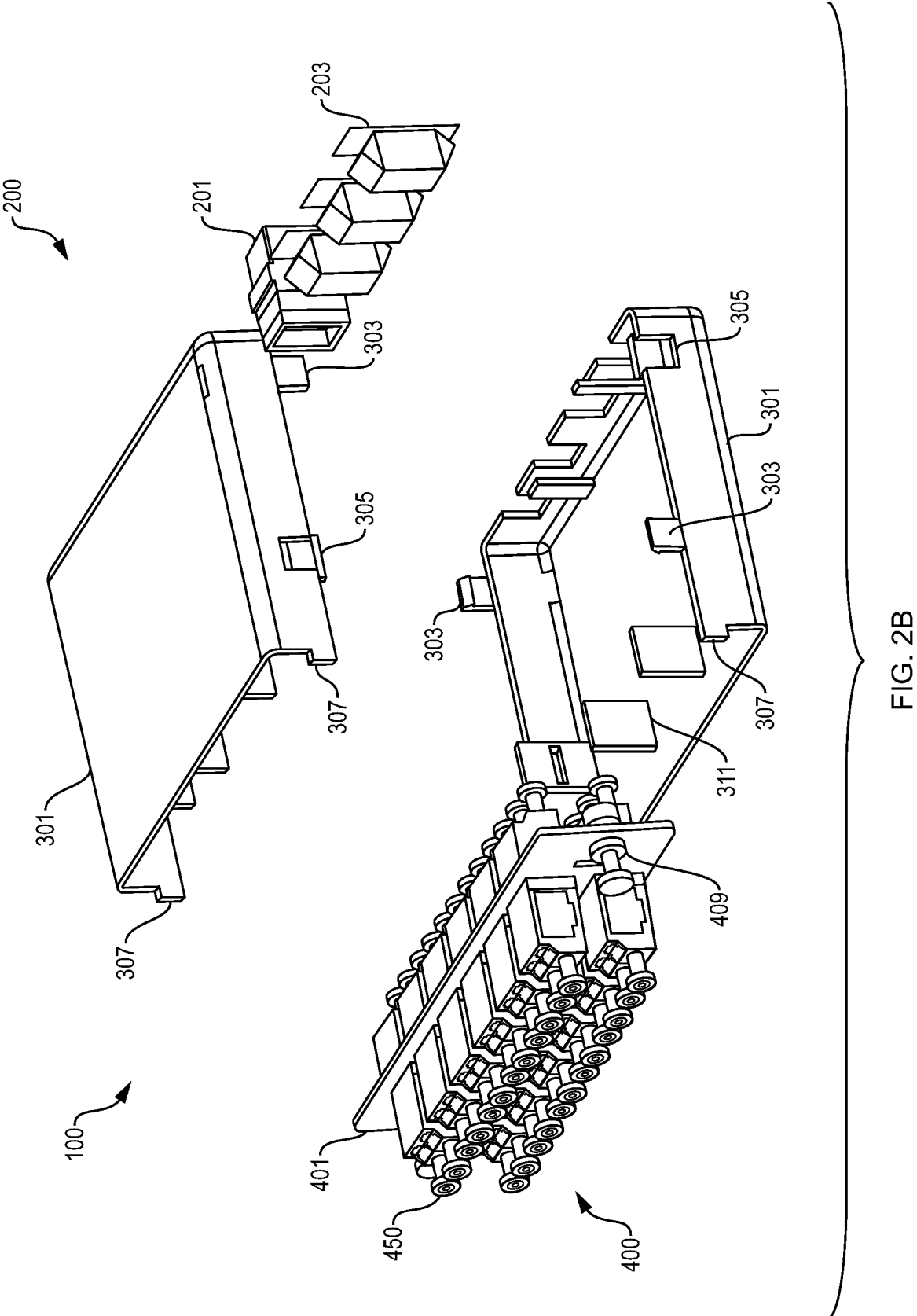
FIG. 2B is an exploded view of a reconfigurable modular fiber optic cassette reconfigurable modular fiber optic cassette of FIG. 2A in accordance with various embodiments.

Referring now to FIGS. 2A-2B and 3B, in some embodiments, the cassette 300 can generally include an open front face for receiving the adapter panel 400 therein. To facilitate mounting of the adapter panel 400 to cassette 300, the cassette 300 can be provided with one or more mounting tabs 307 configured to provide interlocking engagement with mounting slots 405 of the adapter panel 400. The cassette 300 can also include a substantially closed rear face having at least one push-on slot 309 configured for receiving a blanking plate 203 or a push-on adapter 201 such as, for example, multi-fiber push-on (MPO) adapters or multi-fiber termination push-on (MTP) adapters.

In some embodiments, the cassette 300 can also include one or more supports 311 for providing structural strength and rigidity. In some embodiments, each half-cassette 301 can also include a splice tray (not shown) for better fiber organization.

Furthermore, although shown and described herein in the context of a cross-connection fiber optic cassette, it will be apparent in view of this disclosure that the devices and methods described herein can also be applied to any fiber optic cassette using one or more adapters. For example, in some embodiments the cassette may instead be a fiber optic splice fusion cassette. In such embodiments, the cassette would not include push-on slots 309 but instead would include one or more fiber trunk line apertures for receiving a fiber trunk line. In addition, such fusion splice cassettes would, in some embodiments, include a fusion splice holder therein.

Figures 4A, 4B:
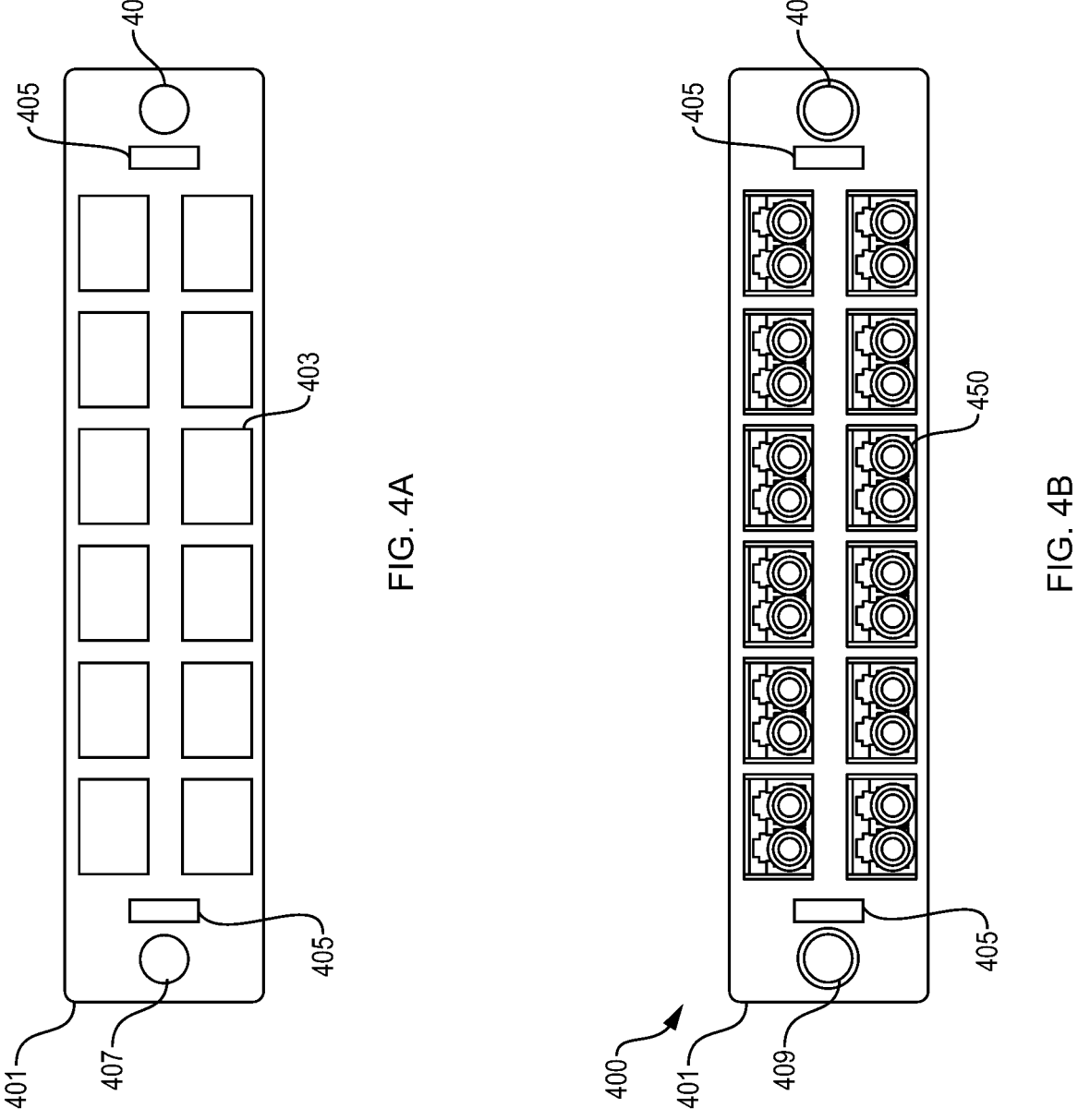
FIG. 4A is a front view of an adapter plate of the reconfigurable modular fiber optic cassette of FIG. 2A in accordance with various embodiments.
FIG. 4B is a front view of an assembled adapter panel of the reconfigurable modular fiber optic cassette of FIG. 2A in accordance with various embodiments.

Referring now to FIGS. 4A and 4B, the adapter panel 400 can generally include an adapter plate 401 having a plurality of adapters 450 installed thereon. The adapter panel 400 (and by extension the adapter plate 401) can generally be of any size and configuration compatible with the cassette 300. For example, as shown and described herein, the adapter panel 400 and the adapter plate 401 are sized and shaped to conform with the LGX standard to facilitate largely universal installation in any LGX patch panel.

As shown in FIGS. 4A-4B, the adapter plate 401 can generally be constructed of any metal or non-metallic material including, for example, stamped steel, cast iron, cast aluminum, PVC, plastics, fiberglass, combinations thereof, or any other suitable material and can be made via any suitable manufacturing process such as, for example, molding, casting, machining, 3D printing, etc., or combinations thereof. The adapter plate 401 preferably includes mounting slots 405 for engagement with the mounting tabs 307 of the cassette 300 as described above. In addition, the adapter plate 401 includes fastener holes 407 for receiving one or more fasteners 409 (e.g., LGX fasteners as shown).

The adapter plate 401, as shown in FIG. 4A, can further include a plurality of adapter slots 403 configured to retain a desired number of adapters 450 in a desired arrangement by a desired connection mechanism. For example, the adapter plate 401 of the adapter panel 400 shown in FIGS. 4A-4B includes 12 adapter slots 403 oriented horizontally and configured in a 2×6 arrangement. The adapter slots 403 shown in FIG. 4A lack corresponding screw holes and are thus compatible with adapters 450 (e.g., Lucent Connector Duplex (LCD) adapters as shown) configured to be connected to the adapter plate 401 by a push-on attachment mechanism. However, it will be apparent in view of this disclosure that any suitable adapter plate configuration can be used in connection with any compatible adapter 450 or set of adapters 450 in accordance with various embodiments.

The adapters 450 can be any suitable adapter including, for example, subscriber connector simplex, subscriber connector duplex, Lucent Connector Duplex, Lucent Connector Quad, straight tip connector, ferrule connector, mechanical transfer registered jack, multi-fiber push-on, multi-fiber termination push-on, e2000, or combinations thereof.

Example Adapter Panel Configurations

The example adapter panel configurations described below with reference to FIGS. 5A-C, 6A-B, and 7A-B are illustrative examples of common configurations. However, it will be apparent in view of this disclosure that adapter plates having any number of mounting slots in any orientation and configuration can be used in connection with any type or mix of types of adapters in accordance with various embodiments.

Figures 5A, 5B:
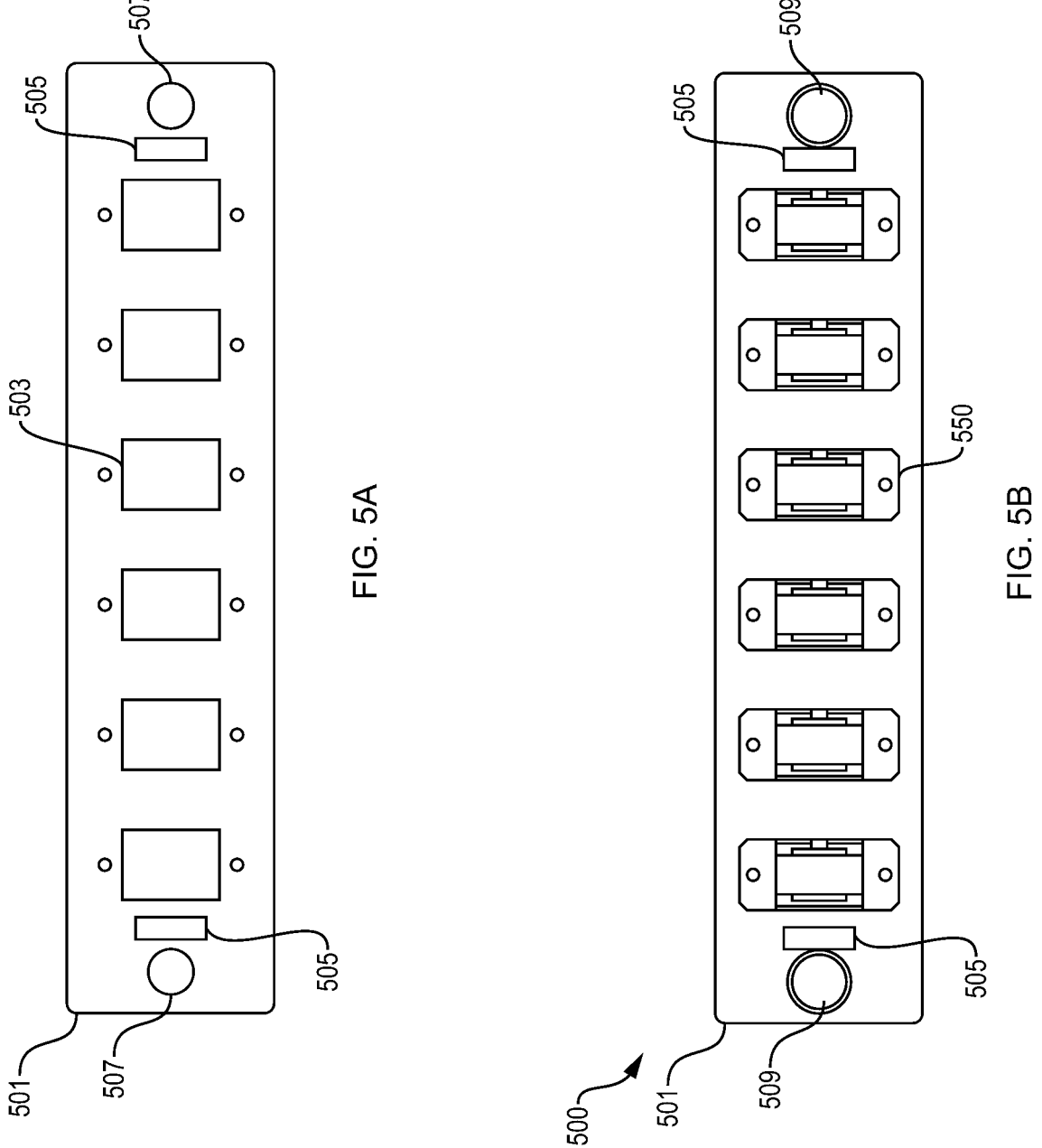
FIG. 5A is a front view of a six-slot adapter plate having a linear slot arrangement in accordance with various embodiments.
FIG. 5B is a front view of a six subscriber connector simplex (SC) adapter panel assembled using the six-slot adapter plate of FIG. 5A in accordance with various embodiments.
Figure 5C:
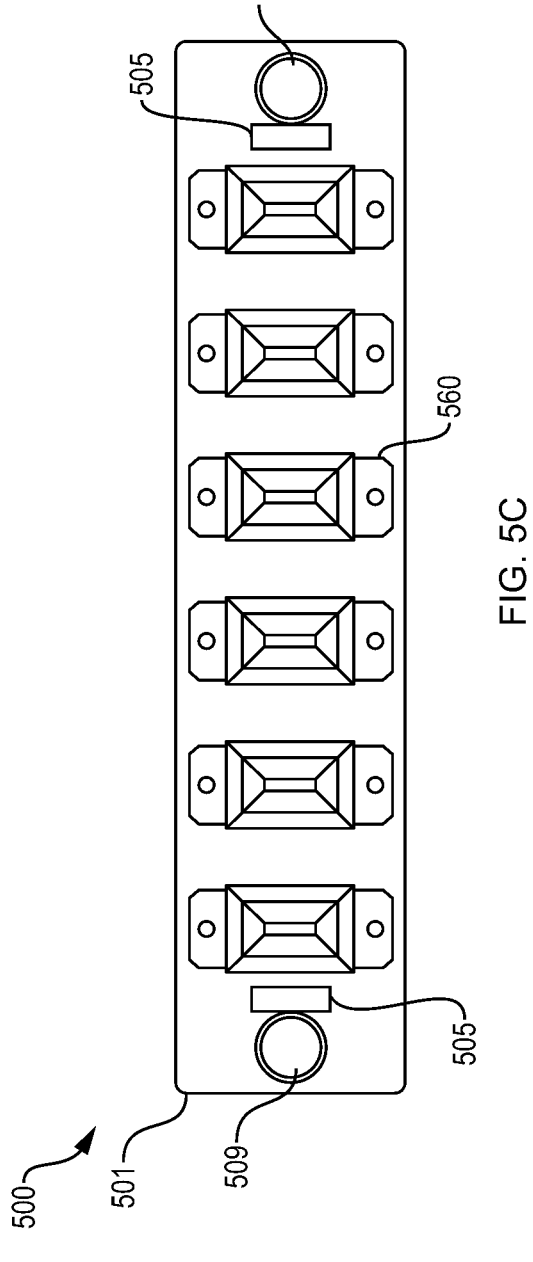
FIG. 5C is a front view of a six MTP adapter panel assembled using the six-slot adapter plate of FIG. 5A in accordance with various embodiments.

Referring now to FIGS. 5A-5C, an adapter plate 501 includes mounting slots 505 for engagement with the mounting tabs 307 of the cassette 300 as described above. In addition, the adapter plate 501 includes fastener holes 507 for receiving one or more fasteners 509 (e.g., LGX fasteners as shown).

The adapter plate 501 shown in FIGS. 5A-5C includes six (6) adapter slots 503 oriented vertically and configured in a linear arrangement. The adapter slots 503 include corresponding screw holes and are thus compatible with either adapters 550, 560 (e.g., SC and MTP adapters as shown) configured to be connected to the adapter plate 501 by a screw-on flange attachment or by a push-on attachment. However, it will be apparent in view of this disclosure that any compatible adapter 550, 560 or set of adapters 550, 560 can be used in accordance with various embodiments.

Figures 6A, 6B:
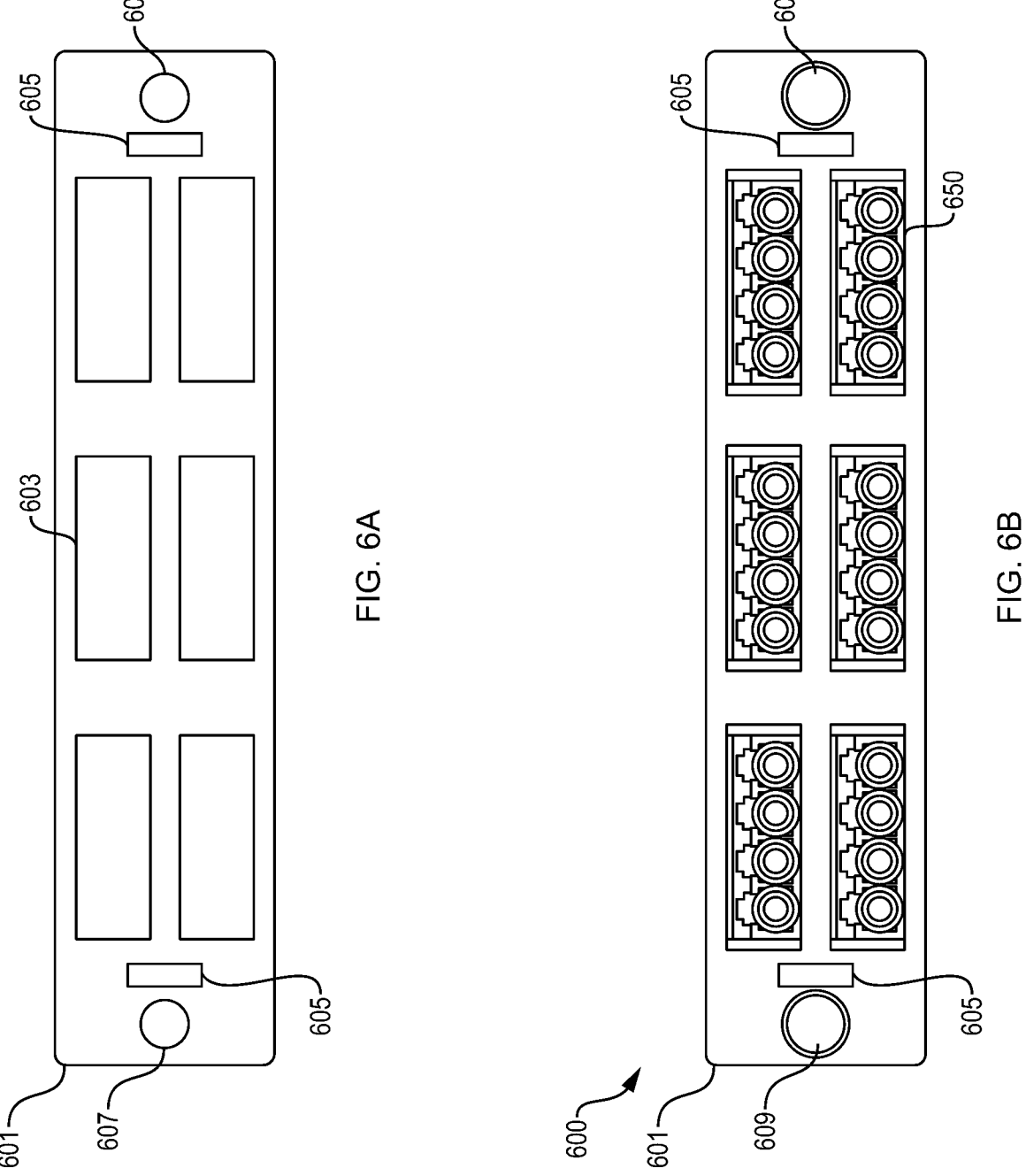
FIG. 6A is a front view of a six-slot adapter plate having a 2×3 arrangement in accordance with various embodiments.
FIG. 6B is a front view of a six Lucent Connector Quad (LCQ) adapter panel assembled using the six-slot adapter plate of FIG. 6A in accordance with various embodiments in accordance with various embodiments.

Referring now to FIGS. 6A-6B, an adapter plate 601 includes mounting slots 605 for engagement with the mounting tabs 307 of the cassette 300 as described above. In addition, the adapter plate 601 includes fastener holes 607 for receiving one or more fasteners 609 (e.g., LGX fasteners as shown).

The adapter plate 601 shown in FIGS. 6A-6B includes six (6) adapter slots 603 oriented horizontally and configured in a 2×3 arrangement. The adapter slots 603 lack corresponding screw holes and are thus compatible with adapters 650 (e.g., LCQ adapters as shown) configured to be connected to the adapter plate 601 by a push-on attachment mechanism. However, it will be apparent in view of this disclosure that any compatible adapter 650 or set of adapters 650 can be used in accordance with various embodiments.

Figure 7A:
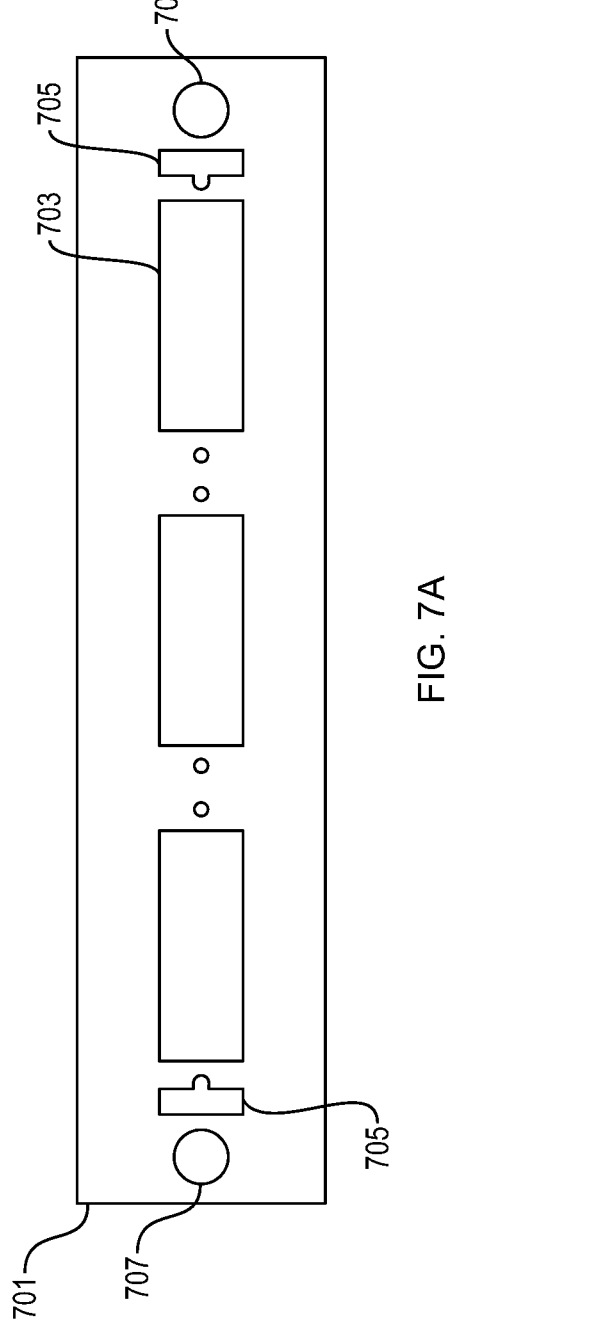
FIG. 7A is a front view of a three-slot adapter plate having a linear slot arrangement in accordance with various embodiments.
Figure 7B:
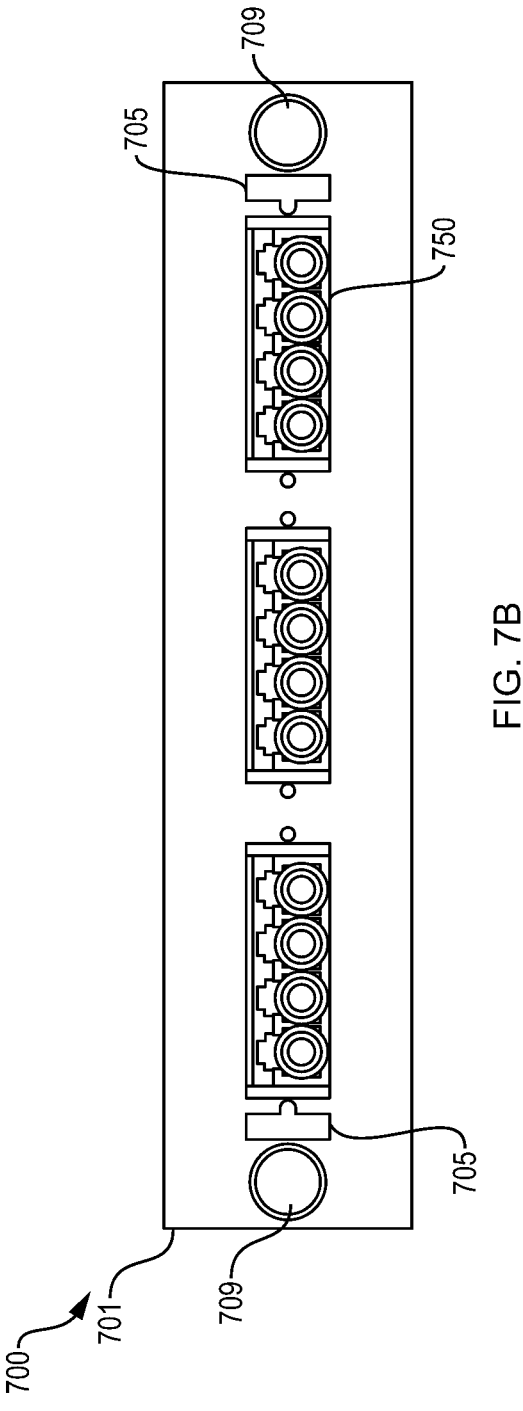
FIG. 7B is a front view of a three LCQ adapter panel assembled using the three-slot adapter plate of FIG. 5A in accordance with various embodiments.

Referring now to FIGS. 7A-7B, an adapter plate 701 includes mounting slots 705 for engagement with the mounting tabs 307 of the cassette 300 as described above. In addition, the adapter plate 701 includes fastener holes 707 for receiving one or more fasteners 709 (e.g., LGX fasteners as shown).

The adapter plate 701 shown in FIGS. 7A-7B includes three (3) adapter slots 703 oriented horizontally and configured in a linear arrangement. The adapter slots 703 include corresponding screw holes and are thus compatible with either adapters 750 (e.g., LCQ adapters as shown) configured to be connected to the adapter plate 701 by a screw-on flange attachment or by a push-on attachment. However, it will be apparent in view of this disclosure that any compatible adapter 750 or set of adapters 750 can be used in accordance with various embodiments.

The reconfigurable modular fiber optic cassettes 200 described herein provide at least the following advantages:

By limiting the cassette 300 assembly to two copies of the same part (i.e., the half-cassette 301), without needing a different cassette part for each adapter panel configuration, the number of unique cassette parts to be purchased, sorted, stored, and transported by the installer is reduced to one. That is, the installer will always be confident in having the correct bottom and top of the cassette because they are all the same.

In addition, the cassette 300 can be assembled by simple push-on interlocking tabs. This is a significant simplification in contrast to the prior art installation, which requires installing of a plurality of screws to assemble the top and bottom portions of each cassette.

Furthermore, because the cassette 300 is compatible with adapter panels 400 of any configuration and adapter type, the installer needs only carry one set of adapter panels. This is a significant simplification in contrast to the prior art, wherein the installer needs to stock and transport not only a full set of various (relatively small) adapter panel configurations for wall patch panels, but also needs to stock and transport and a full set of (relatively large) cassette adapter panel configurations for rack patch panels, including unique top and bottom portions of the cassette for each configuration.

Thus, by reducing the number of unique parts and simplifying the installation process, the reconfigurable modular fiber optic cassettes 200 significantly reduce labor costs, material costs, inventory and storage requirements, and save installation time, resulting in quicker, better installations at lower cost.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications, and variations may be effected to the particular embodiments by those of skill in the art without departing from the scope of the invention, which is defined solely by the claims appended hereto. The invention is therefore not limited by the above-described embodiments and examples.

What is claimed is:

1. A reconfigurable modular fiber optic cassette comprising:
   a cassette assembly including:
      identical first and second half-cassettes each having one or more sides extending outward from a surface thereof and around a portion of a circumference thereof,
      a plurality of assembly tabs, each formed in or on the one or more sides wherein, in a mirrored orientation of the first and second half-cassettes, the plurality of assembly tabs interlocks to form the cassette assembly,
      an interior volume of the cassette assembly defined between the surfaces and the sides of the first and second half-cassettes,
      at least one opening defined in the sides of the cassette assembly, the opening sized to receive an adapter panel, and
      first and second mounting tabs extending from the sides of the cassette assembly adjacent the opening, the first and second mounting tabs configured to interlock with first and second mounting slots of an adapter plate; and
   the adapter panel including;
      the adapter plate including:
         the first and second mounting slots defined therein, and
         one or more adapter slots defined in the adapter plate between the first and second mounting slots; and
      one or more adapters mounted in the adapter slots.

2. The reconfigurable modular fiber optic cassette of claim 1, further comprising at least one aperture formed in the sides of the cassette assembly.

3. The reconfigurable modular fiber optic cassette of claim 2, the aperture sized to receive at least one of a multi-fiber push-on adapter, a multi-fiber termination push-on adapter, or a blanking plate.

4. The reconfigurable modular fiber optic cassette of claim 1, wherein the cassette assembly further comprises a structural support extending between the surface of the first half-cassette and the surface of the second half-cassette.

5. The reconfigurable modular fiber optic cassette of claim 1, wherein the adapter panel is a LGX adapter panel.

6. The reconfigurable modular fiber optic cassette of claim 1, wherein the adapters include at least one of a subscriber connector simplex, a subscriber connector duplex, a Lucent Connector Duplex, a Lucent Connector Quad, a straight tip connector, a ferrule connector, a mechanical transfer registered jack, a multi-fiber push-on, a multi-fiber termination push-on, or combinations thereof.

7. The reconfigurable modular fiber optic cassette of claim 1, wherein the adapter plate includes 12 adapter slots formed therein.

8. The reconfigurable modular fiber optic cassette of claim 1, wherein the adapter plate includes 6 adapter slots formed therein.

9. The reconfigurable modular fiber optic cassette of claim 8, wherein the 6 adapter slots are arranged linearly between the mounting slots.

10. Reconfigurable modular fiber optic cassette of claim 8, wherein the 6 adapter slots are arranged in a 2×3 array between the mounting slots.

11. The reconfigurable modular fiber optic cassette of claim 1, wherein the adapter plate includes 3 adapter slots formed therein.

12. The reconfigurable modular fiber optic cassette of claim 1, wherein the adapters are mounted to the adapter slots by a push-on attachment mechanism.

13. The reconfigurable modular fiber optic cassette of claim 1, wherein the adapters are mounted to the adapter slots by a flange and screw attachment.

14. The reconfigurable modular fiber optic cassette of claim 1, wherein each of the first and second half-cassettes is formed from at least one of stamped steel, cast iron, cast aluminum, PVC, plastics including molded plastics, extruded plastics, or cast plastics, fiberglass, or combinations thereof.

15. The reconfigurable modular fiber optic cassette of claim 1, further comprising a splice tray formed in each of the first and second half-cassettes.

16. The reconfigurable modular fiber optic cassette of claim 2, the aperture sized to receive a fiber trunk line.

17. The reconfigurable modular fiber optic cassette of claim 1, further comprising a fusion splice holder positioned within the interior volume of the cassette assembly.

18. The reconfigurable modular fiber optic cassette of claim 1, further comprising a splice tray positioned within the interior volume of the cassette assembly.

\* \* \* \* \*